March 26, 1929. C. P. EISENHAUER 1,706,777
WATER SOFTENER
Filed Jan. 30, 1928 5 Sheets-Sheet 1

INVENTOR
CHARLES P. EISENHAUER
ATTORNEYS

March 26, 1929.  C. P. EISENHAUER  1,706,777

WATER SOFTENER

Filed Jan. 30, 1928  5 Sheets-Sheet 2

INVENTOR
CHARLES P. EISENHAUER
BY Toulmin Toulmin
ATTORNEYS

March 26, 1929.  C. P. EISENHAUER  1,706,777
WATER SOFTENER
Filed Jan. 30, 1928    5 Sheets-Sheet 3

INVENTOR
CHARLES P. EISENHAUER
BY Toulmin Toulmin,
ATTORNEYS

March 26, 1929.  C. P. EISENHAUER  1,706,777
WATER SOFTENER
Filed Jan. 30, 1928   5 Sheets-Sheet 4
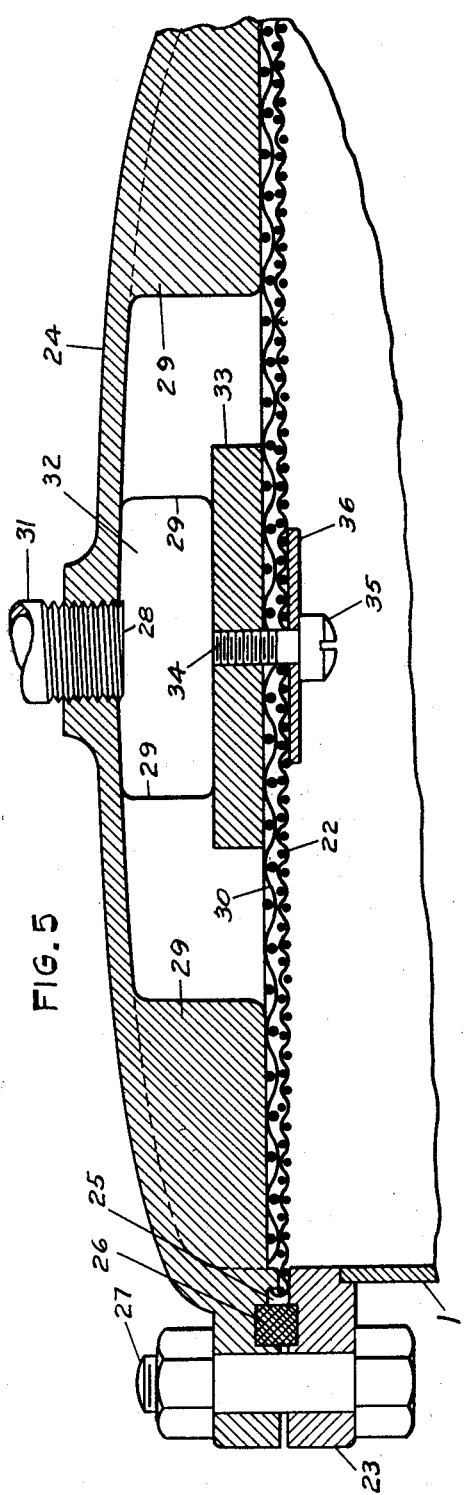
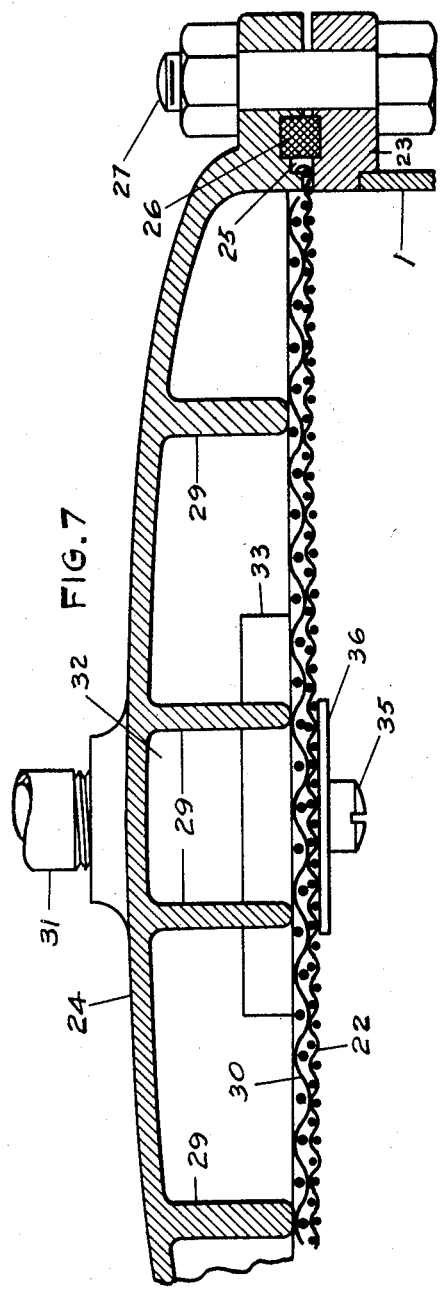
INVENTOR
CHARLES P. EISENHAUER
BY *Toulmin Toulmin,*
ATTORNEYS March 26, 1929.   C. P. EISENHAUER   1,706,777
WATER SOFTENER
Filed Jan. 30, 1928    5 Sheets-Sheet 5

INVENTOR
CHARLES P. EISENHAUER
BY
ATTORNEYS

Patented Mar. 26, 1929.

1,706,777

UNITED STATES PATENT OFFICE.

CHARLES P. EISENHAUER, OF DAYTON, OHIO, ASSIGNOR TO THE DURO COMPANY, OF DAYTON, OHIO, A CORPORATION OF OHIO.

WATER SOFTENER.

Application filed January 30, 1928. Serial No. 250,538.

My invention relates to water softeners.

It is the object of my invention to provide a water softener which is adapted to soften water by passing the water and regenerating solution both in the same direction through the mineral bed and preferably both in an upward direction. Heretofore, it has been regarded as necessary to pass the brine solution in the opposite direction from the direction in which the hard water passes through the body of softening mineral or material in order to secure proper diffusion of the brine through the mineral mass to suitably regenerate it.

By "mineral" I refer to any type of natural or synthetic material for the softening of water. By "brine" I refer to any type of regenerating liquid.

By my invention I have been able to provide a construction and a method of operation which permits of the passing of the water to be softened and then the brine to regenerate the mineral in the same direction, upwardly, if desired, through the mineral without loss of mineral and with substantially no loss in efficiency or increase of the quantity of brine employed in any material manner.

It is an object to move the mineral body bodily upwardly against the upper screen and to force the brine through the mineral body by reason of the fresh water pressure behind it as a piston. This fresh water piston may or may not be used, but it is desirable to use it.

Referring to the drawings:

Figure 5 is an enlarged section through the joint between the tank and the cover;

Figure 7 is a section on the line 7—7 of Figure 2 showing an enlarged section of the upper screen and support;

Figure 1:
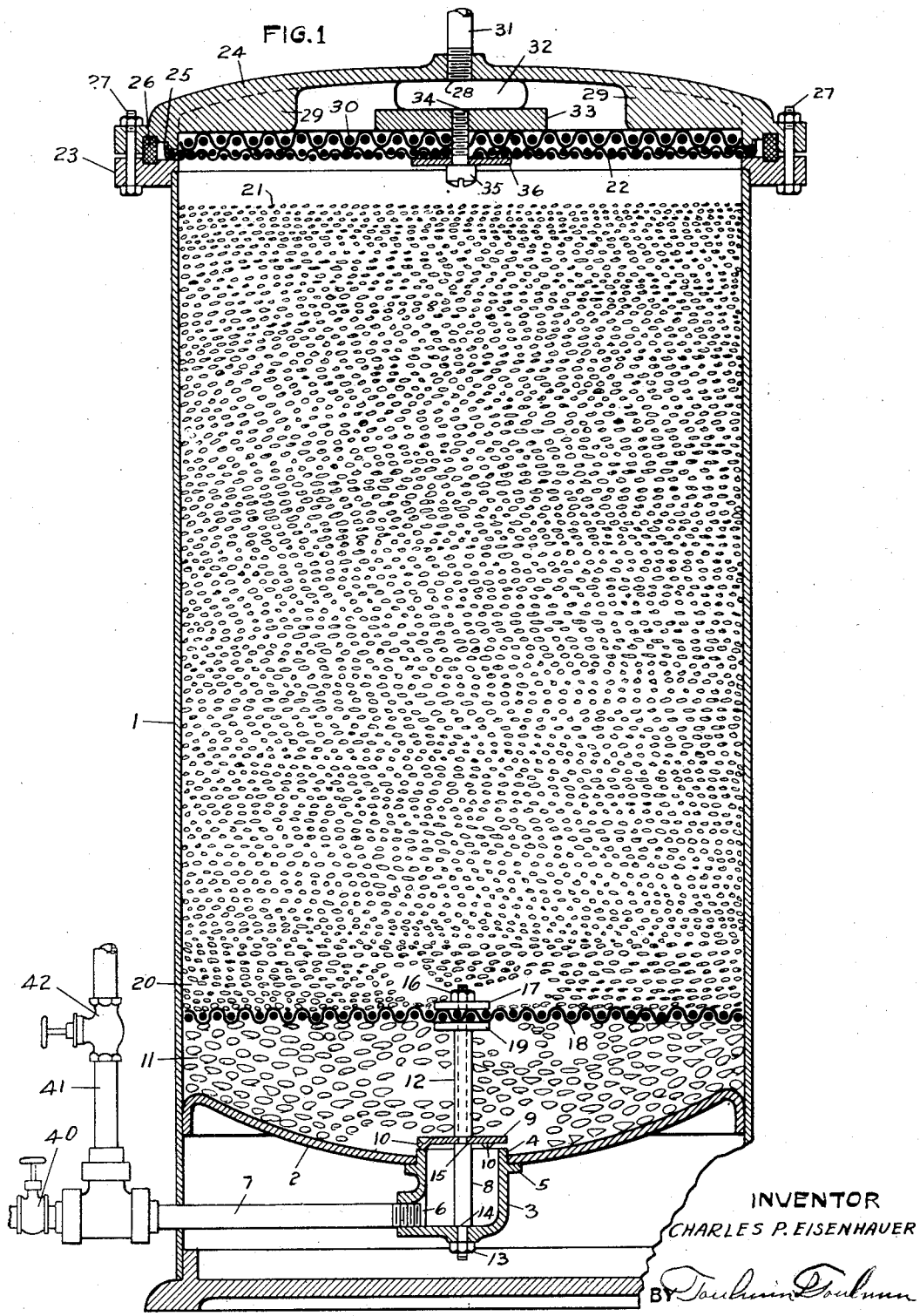
Figure 1 is a vertical section through the water softening tank showing the arrangement of gravel distributors, retainers and screens with the water softening material in its lower or inactive position.
Figure 2:
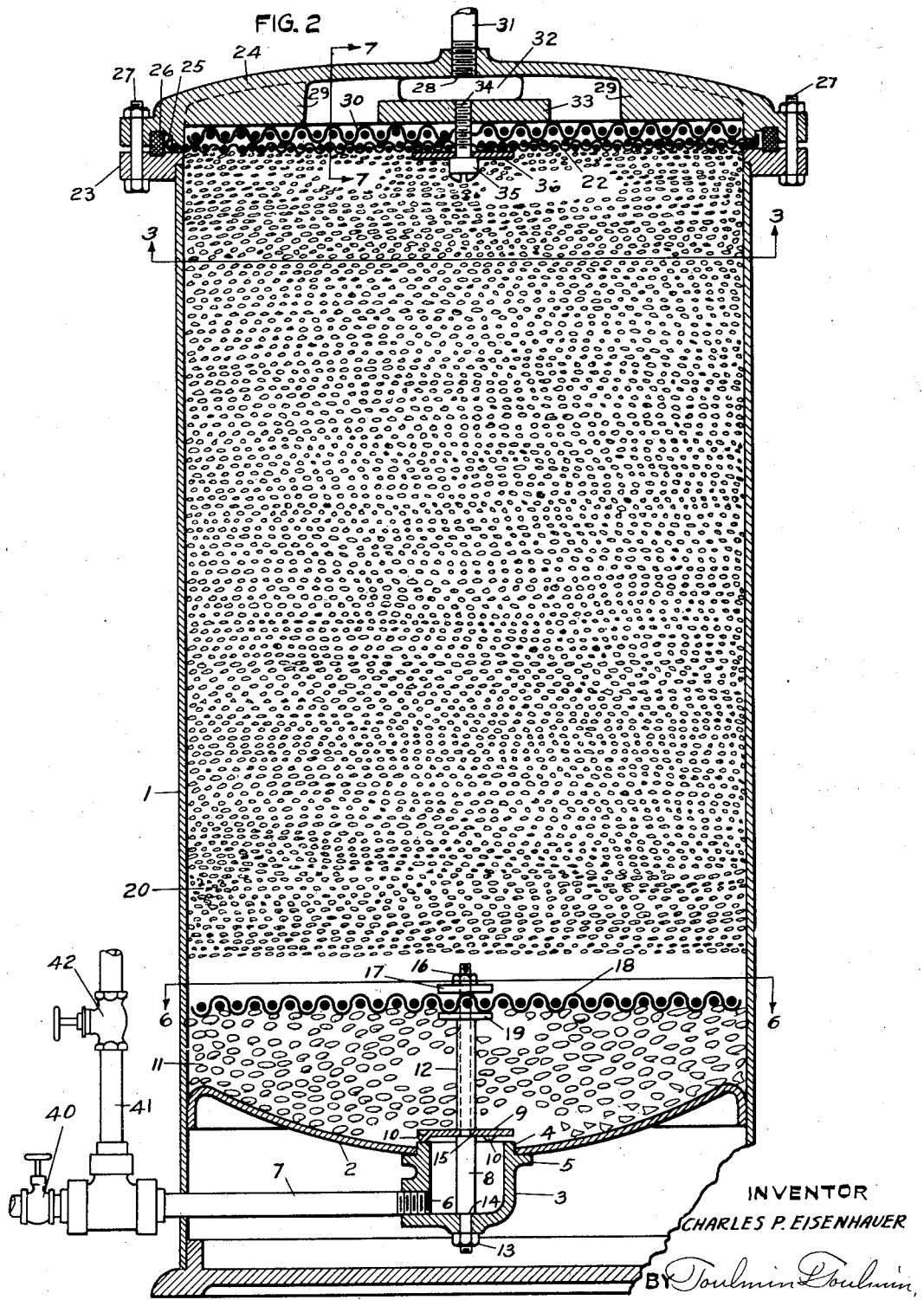
Figure 2 is a similar view with the mineral in its active or upper position with liquid flowing through the mineral in an upward direction.
Figure 3:
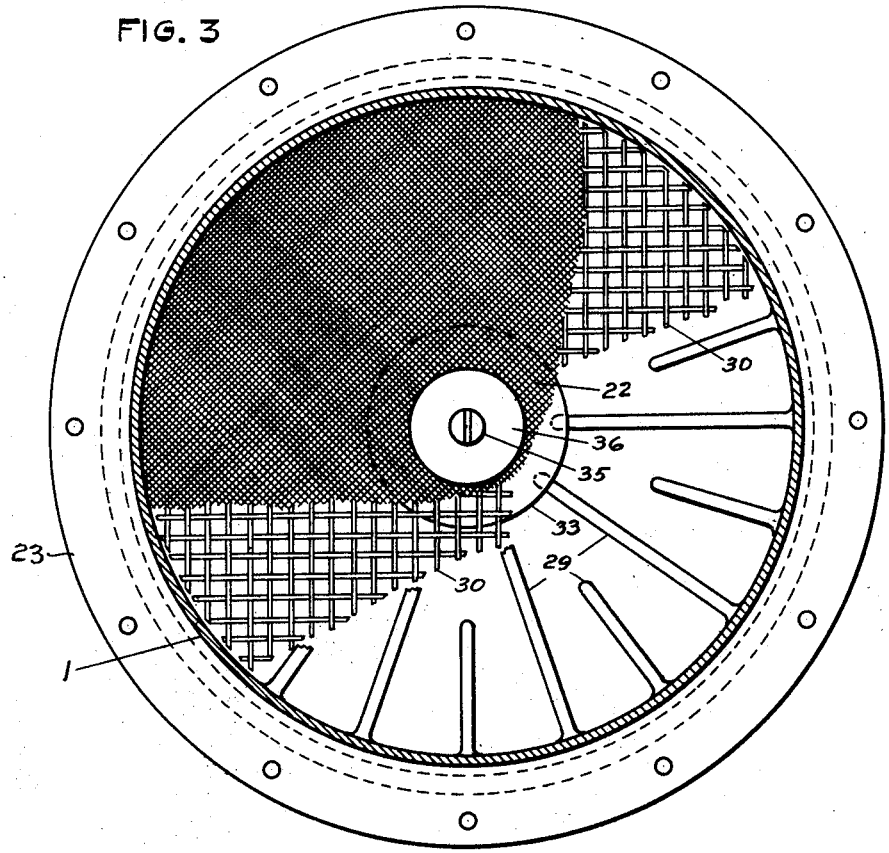
Figure 3 is a section on the line 3—3 of Figure 2 looking upwardly in the direction of the arrows.
Figure 4:
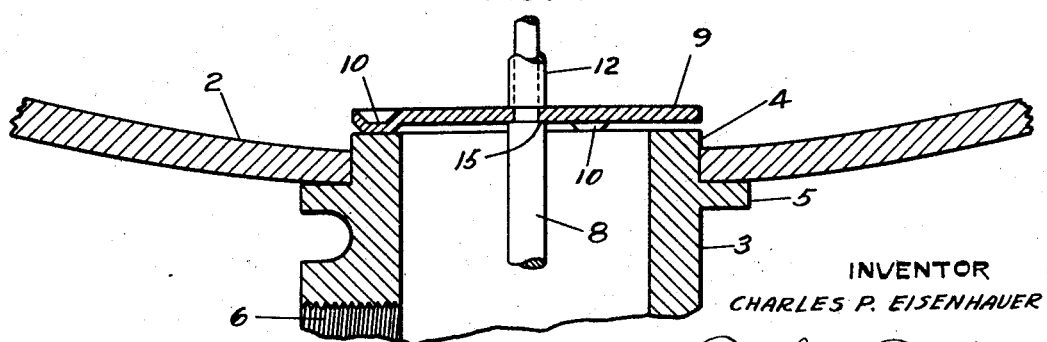
Figure 4 is an enlarged section through the distributor at the bottom of the water softening tank.
Figure 6:
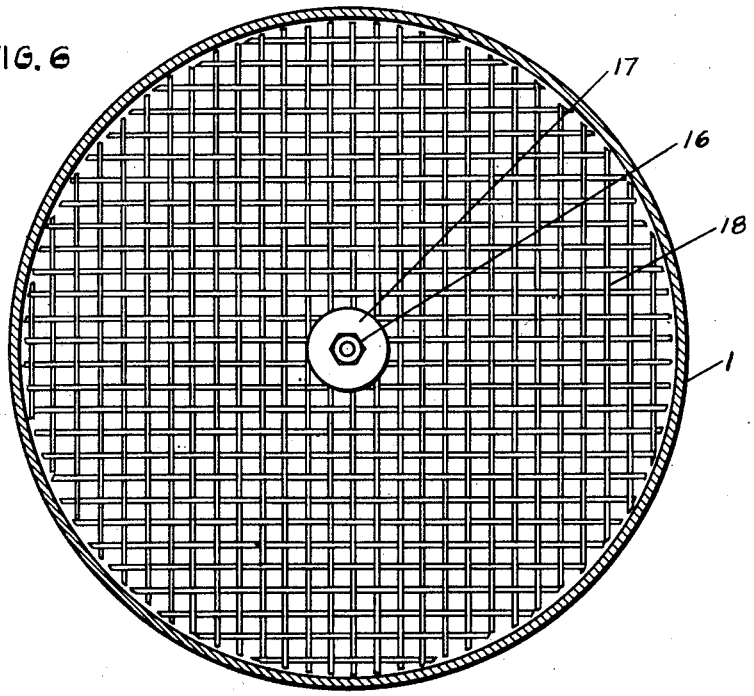
Figure 6 is a section on the line 6—6 looking downwardly in the direction of the arrows on the coarse retaining screen for holding the gravel in position.
Figure 8:
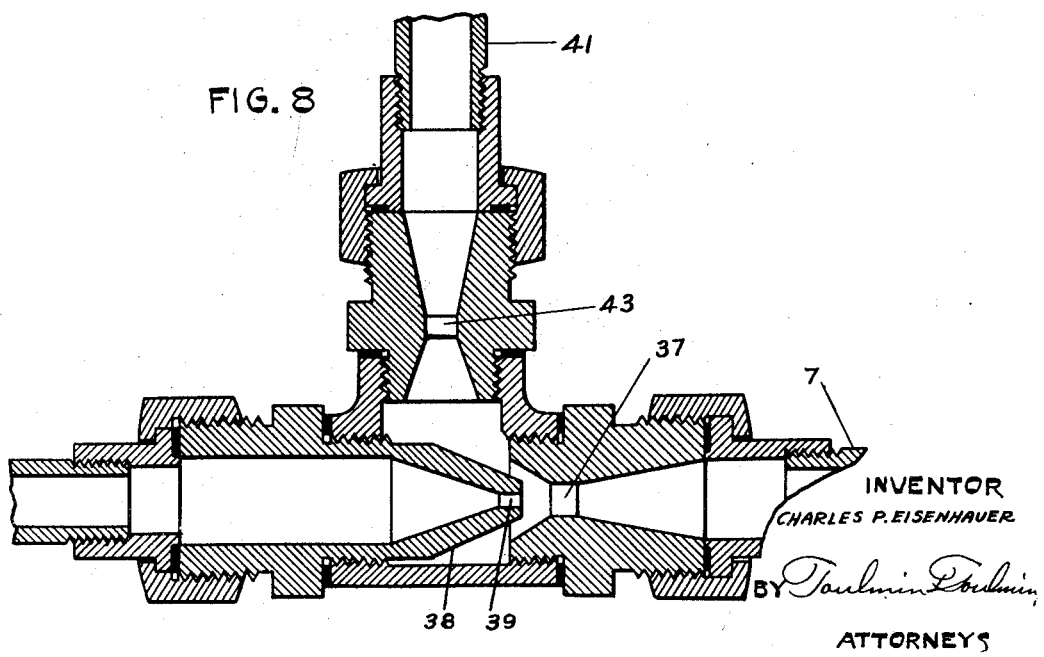
Figure 8 is an enlarged section of the injector.

Referring to the drawings, 1 is a tank for water softening material having a bottom 2. This bottom 2 is provided with a fitting consisting of a casing 3 having a sleeve 4 projecting through the bottom 2 and being limited in its approach into the tank 1 by an annular shoulder 5. A port 6 is provided on one side of this casing 3 for supporting the inlet pipe 7.

Centrally of this casing 3 is a retaining pin 8 on which is mounted a distributor plate 9 having a series of depending lugs 10 about one-sixteenth of an inch in depth which hold this plate 9 about one-sixteenth of an inch from the top of the casing 3 so that the liquid passing upwardly through the casing may be distributed around the slot thus formed between the plate 9 and the casing 3 into the gravel 11. This plate 9 is retained in position by a sleeve 12 mounted on the retaining pin 8. The retaining pin is detachably mounted in the casing 3 by the nut 13 mounted on the lower end of the pin 8 and by reason of a shoulder 14 on the pin 8 on the inside of the casing 3. A shoulder 15 also serves to support the plate 9 while the other side of the plate is engaged with the sleeve 12. The upper end of the pin is provided with a nut 16 which holds the washer 17 in engagement with the coarse gravel retaining screen 18 which is supported on the under side of a washer 19 mounted on the sleeve 12 and the pin 8.

This screen 18 is very coarse and is only sufficiently close in mesh to retain the large pieces of gravel 11.

Above this coarse screen is a body of mineral used for softening purposes designated 20. The mineral is of sufficient depth to leave a space of about an inch to one inch and a half between its top 21 and the fine screen 22 which is sufficiently fine to retain it within the softener. This fine screen is of a mesh approximately 14 by 88 per inch. Objects can be readily seen through it but it is of sufficient density to keep the mineral 20 in position. The edge of this screen 22 is mounted upon a flange 23 of the casing 1 and beneath the cover 24. It is turned over at its edge between the flange 23 and cover 24 into a slot 25. This slot also contains a live rubber ring 26 so that when the cover is bolted down by the bolts 27 the live rubber ring 26 is compressed and the turned-up edge of the screen 22 is also compressed so that a tight joint is effected. An outlet 28 is provided from the top of the tank. A plurality of radiating ribs 29 are disposed radially within the cover 24 and depend downwardly to engage with a coarse retaining member 30 which serves to support and reenforce the more delicate screen 22 to hold it against the pressure of the liquids which move upwardly through the mineral mass 20.

This cover 24 is provided with an exit pipe 31 which communicates with a central passageway 32 in the head below which is located a spaced distributor or spreader plate 33. This plate 33 carries a screw 34 passing through the support and its screen terminating in a head 35 which supports a washer 36.

Turning to the inlet pipe 7 it will be noted that the inlet pipe is provided with an injector having a restricted orifice 37 and an injector nozzle 38 which has a restricted passageway therethrough 39. The size of this passageway determines the rate of flow of the incoming hard water. The valve 40 controls the hard water line.

The brine is supplied through the brine line 41 controlled by the valve 42. The brine line orifice 43 determines the rate of flow of the brine.

This orifice 39 and orifice 43 are adjusted according to the rate of flow desired for the particular installation in order to secure the result heretofore indicated and hereinafter more fully described after the successive movements of the liquids through this apparatus.

*Method of operation.*

The incoming hard water passes through the pipe 7 when the valve 40 is opened with the brine valve 42 closed. This water passes upwardly beneath the distributor plate 9 thence through the gravel 11 and gravel retaining screen 18 and lifts the mineral 20 holding it against the upper screen 22 whence it makes its exit through the exit pipe 31.

When it is desired to apply brine to the system to regenerate the mineral the valve 42 is opened and the movement of the hard water draws the brine into the softening tank. The proportion of water entering through the hard water line and the proportion of brine is according to the size of the orifice 39 and 43 to give the proper mixture of brine as to strength and as to rate of flow. The brine then occupies the mineral space and as soon as this occurs the brine is shut off so that the hard water continues to flow. This hard water so entering forms a piston of water which forces the brine out of the tank in a body. By reason of the fact that the pressure holds the mineral up against the screen at all times there is no churning or other disturbance of the mineral body and as the rate of the flow of the hard water is so regulated that the brine can be forced outwardly as a body without being mixed with the new hard water that is coming in, there is no diffusion of the brine or no reduction in the efficiency of the softening mineral.

One of the important features of this invention is to draw the brine in with the hard water so that a predetermined strength of the brine will be accomplished, then cutting off the brine and then letting the hard water enter without any brine to act as the piston to force the brine through the mineral without stirring up the mineral and letting the new hard water dilute the brine already in the softening tank.

In this way a high grade of efficiency is secured with the minimum use of salt, and heretofore the impossibility of softening upwardly and regenerating upwardly has been overcome with the desired degree of economy in such apparatus. By holding the mineral under pressure in a mass against the upper screen with the hard water piston behind the brine, it is possible to secure this result.

It will be understood that I desire to comprehend within my invention such modifications as may be necessary to adapt it to varying conditions and uses.

Having thus fully described my invention, what I claim as new and desire to secure by Letters Patent, is:

1. In combination, a distributor for water softeners consisting of a tank, a distributor casing mounted in one end of said tank, an inlet line connected to said casing, said casing having an open end within said tank, a distributor plate having depending lugs at intervals mounted on said open end and detachable means for retaining said plate in distributing position.

2. In combination, a distributor for water softeners consisting of a tank, a distributor casing mounted in one end of said tank, an inlet line connected to said casing, said casing having an open end within said tank, a distributor plate having depending lugs at intervals mounted on said open end and detachable means for retaining said plate in distributing position, a gravel retaining screen spaced from one end of said tank and means for attaching said screen to said distributor plate retaining means.

3. In combination, a distributor for water softeners consisting of a tank, a distributor casing mounted in one end of said tank, an inlet line connected to said casing, said casing having an open end within said tank, a distributor plate having depending lugs at intervals mounted on said open end and detachable means for retaining said plate in distributing position, a gravel retaining screen spaced from one end of said tank and means for attaching said screen to said distributor plate retaining means and means for spacing said screen from said distributor plate.

4. In combination, a water softening tank, a relatively large open ended casing mounted in the bottom thereof, means for delivering fluid to said casing, a distributor plate mounted in spaced relationship to provide an annular passageway between the plate and the end of the casing opening into the tank, a coarse screen spaced from said distributor plate adapted to retain gravel between it and the bottom of the tank, said gravel being prevented by the distributor pipe from entering the open ended casing and means for retaining said casing, distributor plate and coarse screen in a predetermined relationship.

5. In combination, a water softening tank, a relatively large open ended casing mounted in the bottom thereof, means for delivering fluid to said casing, a distributor plate mounted in spaced relationship to provide an annular passageway between the plate and the end of the casing opening into the tank, a coarse screen spaced from said distributor plate adapted to retain gravel between it and the bottom of the tank, said gravel being prevented by the distributor pipe from entering the open ended casing and means for retaining said casing, distributor plate and coarse screen in a predetermined relationship, said means for retaining relationship consisting of a retaining pin detachably mounted in the bottom of said casing and detachably connected to the top of said screen, and spacing means thereon for spacing said casing, distributor and screen.

6. In combination, a water softening tank, a relatively large open ended casing mounted in the bottom thereof, means for delivering fluid to said casing, a distributor plate mounted in spaced relationship to provide an annular passageway between the plate and the end of the casing opening into the tank, a coarse screen spaced from said distributor plate adapted to retain gravel between it and the bottom of the tank, said gravel being prevented by the distributor pipe from entering the open ended casing and means for retaining said casing, distributor plate and coarse screen in a predetermined relationship, said means for retaining relationship consisting of a retaining pin detachably mounted in the bottom of said casing and detachably connected to the top of said screen, and spacing means thereon for spacing said casing, distributor and screen, said means for spacing the distributor plate from the open end of the casing consisting of depending spaced lugs on said plate engaging with the margin of said casing.

In testimony whereof, I affix my signature.

CHARLES P. EISENHAUER.